United States Patent
Lee et al.

(10) Patent No.: US 10,520,198 B2
(45) Date of Patent: Dec. 31, 2019

(54) GRIDDLE AND COOKING APPLIANCE HAVING A GRIDDLE

(71) Applicant: LG ELECTRONICS INC., Seoul (KR)

(72) Inventors: Kookhaeng Lee, Seoul (KR); Yangho Kim, Seoul (KR); Jun Ho Seok, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 15/698,046

(22) Filed: Sep. 7, 2017

(65) Prior Publication Data

US 2018/0356101 A1   Dec. 13, 2018

(30) Foreign Application Priority Data

Jun. 12, 2017   (KR) .......................... 10-2017-0073430

(51) Int. Cl.
| | | |
|---|---|---|
| *F24C 15/10* | (2006.01) | |
| *F24C 3/04* | (2006.01) | |
| *A47J 37/06* | (2006.01) | |

(52) U.S. Cl.
CPC ............ *F24C 3/04* (2013.01); *A47J 37/0682* (2013.01); *F24C 15/101* (2013.01); *F24C 15/108* (2013.01); *A47J 37/0647* (2013.01)

(58) Field of Classification Search
CPC .................................................... F24C 15/101
USPC .......................... 126/39 H, 41 D, 41 E, 39 R
See application file for complete search history.

(56) References Cited

U.S. PATENT DOCUMENTS

| | | | |
|---|---|---|---|
| 4,416,249 A | 11/1983 | Reynolds et al. | |
| 5,062,408 A | 11/1991 | Smith et al. | |
| 5,890,482 A | 4/1999 | Farnsworth et al. | |
| 2007/0113838 A1 | 5/2007 | Czajka et al. | |
| 2009/0178575 A1* | 7/2009 | Baker ................... | A21B 1/245 |
| | | | 99/401 |
| 2011/0067577 A1 | 3/2011 | Riddle et al. | |

FOREIGN PATENT DOCUMENTS

| | | |
|---|---|---|
| EP | 2 161 503 | 3/2010 |
| JP | 2580695 | 6/1998 |

OTHER PUBLICATIONS

Korean Office Action dated Jan. 29, 2018.
European Search report dated Mar. 9, 2018.

* cited by examiner

*Primary Examiner* — Avinash A Savani
(74) *Attorney, Agent, or Firm* — Ked & Associates LLP (57) ABSTRACT

A griddle and a cooking appliance having a griddle is provided. The griddle may include a housing, a heating plate seated on a top of the housing, a burner provided inside the housing under the heating plate, and an exhaust vent forming a passage through which exhaust gas generated in the housing by the burner is discharged. The exhaust vent may be provided at a rear of the housing adjacent to a second end of the heating plate. The burner may be arranged such that a first end of the burner adjacent to a first end of the heating plate is positioned closer to the heating plate than a second end of the burner adjacent to the exhaust vent.

19 Claims, 8 Drawing Sheets

GRIDDLE AND COOKING APPLIANCE HAVING A GRIDDLE

CROSS-REFERENCE TO RELATED APPLICATION(S)

This application claims the priority of Korean Patent Application No. 10-2017-0073430 filed in Korea on Jun. 12, 2017, in the Korean Intellectual Property Office, the disclosure of which is hereby incorporated by reference in its entirety.

BACKGROUND

1. Field

A griddle and a cooking appliance having a griddle are disclosed herein.

2. Background

A cooking appliance, which is a household appliance used to cook food or other items (hereinafter "food"), is installed in a kitchen space and used to cook food as intended by a user. Such cooking appliances can be classified into various types of cooking appliances according to a heat source or shape and types of fuel for cooking.

Cooking appliances can be classified into open-type cooking appliances and closed-type cooking appliances based on how food is cooked, or a type of space in which food to be cooked is placed. The closed-type cooking appliances include ovens and microwaves, and the open-type cooking appliances include cooktops and griddles.

Among these cooking appliances, griddles include a heating means, such as a gas burner or a hot wire, arranged under a cooking plate having an open top. These griddles are used to cook meat and vegetables, for example, on an iron plate-shaped cooking plate heated by the heating means, and are mainly adopted in a large restaurant or a food service station. Recently, household use of the griddles has increased.

Griddles can be classified into electric griddles and gas griddles according to the type of heating means. Among these griddles, the gas griddles include a gas burner arranged under a cooking plate. In the gas griddles, flames generated by burning a gas in the gas burner heat the cooking plate, thereby increasing the temperature of the cooking plate.

An exhaust vent that discharges exhaust gas generated in the gas griddle is formed on or at a back of the gas griddle. The exhaust gas generated in a burning process of the gas burner is moved to the back of the gas griddle along a lower surface of the cooking plate and discharged from the gas griddle through the exhaust vent.

According to the gas griddle as described above, heat is concentrated toward a rear of the gas griddle, and thus, a temperature of the rear of the cooling plate is higher than in other portions due to a heat transfer process in which the exhaust gas generated in a burning process of the gas burner is moved toward the rear of the gas griddle. Accordingly, in the related art gas griddle, there is a difference in temperature between a front and rear of the cooking plate, and thus, uniform cooking is difficult to perform.

In addition, according to the gas griddle, as the cooking plate is heated directly by flames generated by burning the gas in the gas burner, only portions of the cooking plate which directly contact the flames undergo significant increases of temperature and a degree of increase of temperature in the other portions is relatively low. Accordingly, for the related art griddle, due to the difference in temperature between the portions of the cooking plate which directly contact the flames and the other portions of the cooking plate, uniform cooking is difficult to perform.

BRIEF DESCRIPTION OF THE DRAWINGS

Embodiments will be described in detail with reference to the following drawings in which like reference numerals refer to like elements, and wherein.

DETAILED DESCRIPTION

Figure 1:
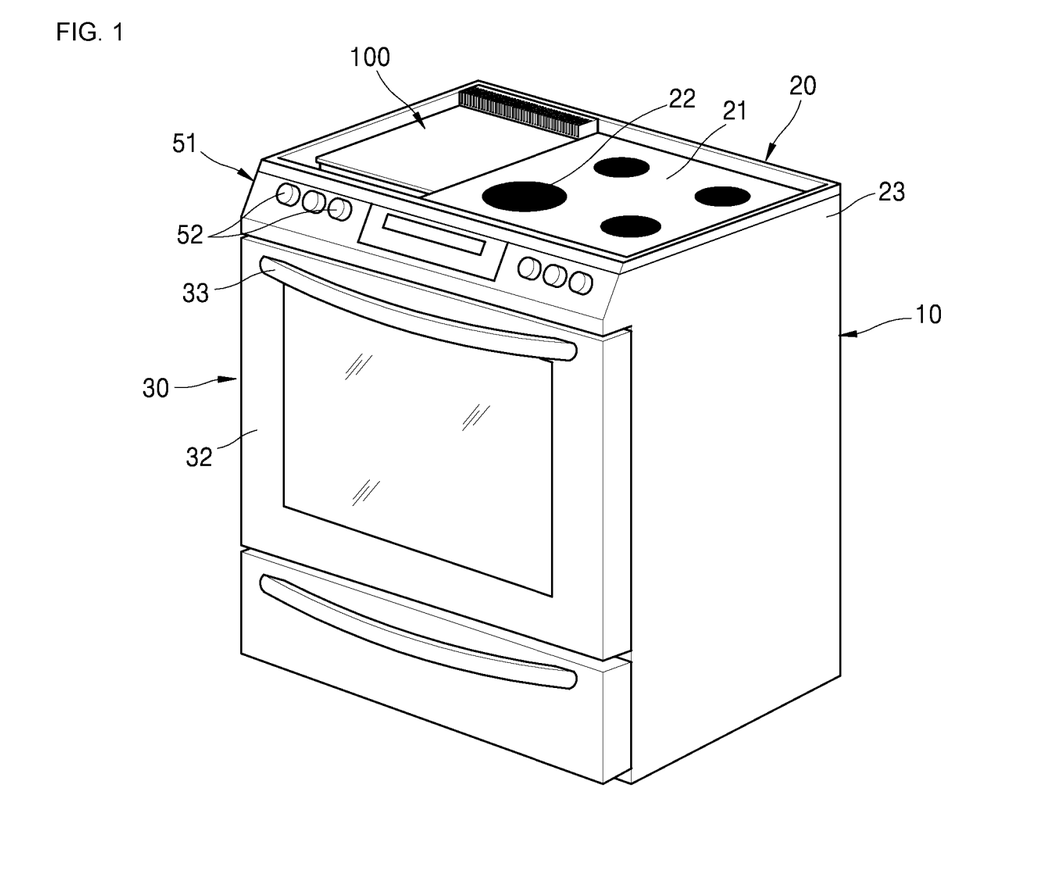
FIG. 1 is a perspective view schematically illustrating a cooking appliance according to an embodiment.
Figure 2:
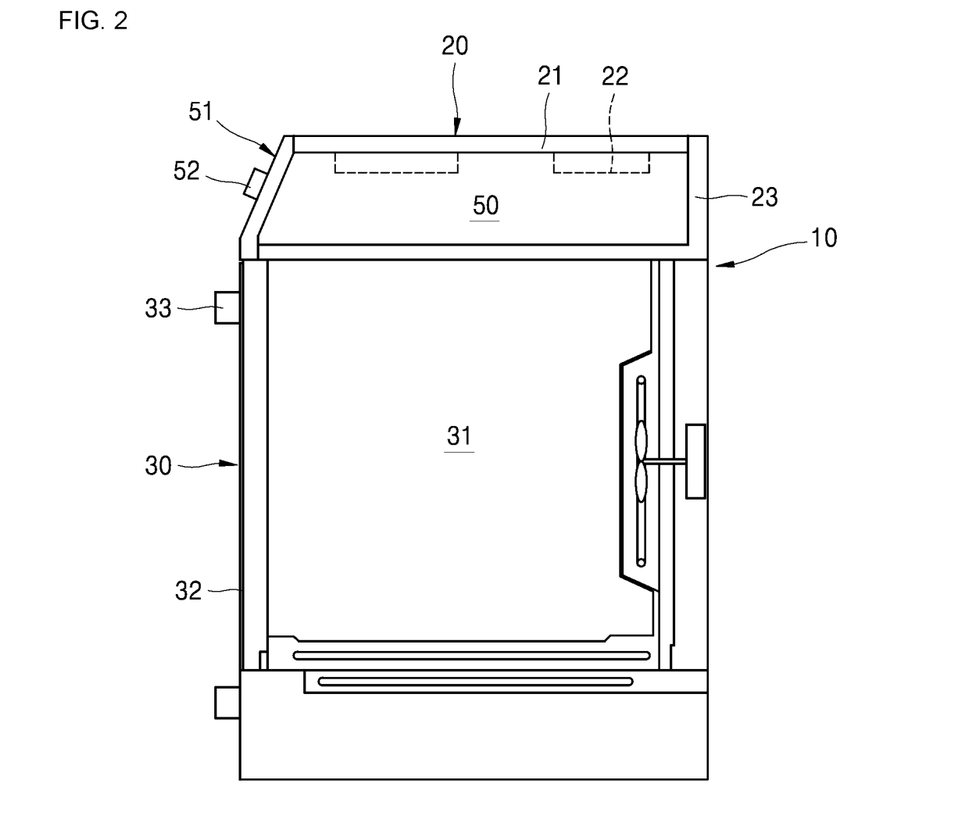
FIG. 2 is a side cross-sectional view illustrating an internal configuration of the cooking appliance according to an embodiment.

FIG. 1 is a perspective view schematically illustrating a cooking appliance according to an embodiment, and FIG. 2 is a side cross-sectional view illustrating an internal configuration of the cooking appliance. Referring to FIGS. 1 and 2, a cooking appliance according to an embodiment may include a body 10, which defines an outer appearance thereof. The body 10 may have a substantially rectangular parallelepiped shape and may be formed of a material having a predetermined strength to protect multiple components provided in an inner space thereof.

A cooktop unit or cooktop 20 may be positioned at an upper end portion of the body 10 and may be configured to cook food by heating the food or a container containing food which is placed in an open space, for example, on the cooktop 20. The cooktop 20 may include an upper plate 21 defining an outer appearance of the upper surface thereof and may support food to be cooked or a container containing food to be cooked.

Food to be cooked or the container containing food may be placed on an upper side of the upper plate 21, and at least one cooktop heating unit or cooktop burner 22 used to heat the food or the container containing food may be positioned on or at a lower side of the upper plate 21. In addition, an oven unit or oven 30 may be provided at a lower side of the cooktop 20. A cooking chamber 31 may be located in an inner space of the oven 30, providing a space where food can be cooked.

The cooking chamber 31 may have a hexahedron shape with an open front face. Food may be cooked by heating an inner space of the cooking chamber 31 while the cooking chamber 31 is shielded or closed. In other words, in the oven 30, the inner space of the cooking chamber 31 may be a space where food is cooked.

A door 32 to selectively open and close the cooking chamber 31 may be pivotably attached to the oven 30. The door 32 may open and close the cooking chamber 31 in a pull-down manner in which an upper end of the door 32 vertically rotates about a lower end of the door 32.

The door 32 may have a hexahedron shape having a predetermined thickness as a whole. A handle 33 may be arranged on a front surface of the door 32 such that a user can grip the handle 33 to pull open the door 32. The user may easily open the door 32 by the handle 33.

A control panel 51 may be provided on or at a front surface of the cooktop 20, that is, on or at an upper side of the door 32. The control panel 51 may have a hexahedron shape with a predetermined inner space. A front surface of the control panel 51 may include an input unit or input 52 through which the user may input operation signals to operate the cooktop 20 and the oven 30.

The input 52 may include a plurality of operation switches, through which the user may directly input operation signals. The control panel 51 may further include a display device or display that provides operation information about the cooking appliance or cooking information about the food, and the user may check various kinds of information about the cooking appliance through the display device.

An electrical component chamber 50 providing a space where electrical component may be positioned may be formed in an inner space of the body 10, namely, a space between the cooktop 20 and the oven 30. The control panel 51 may be positioned on or at a front surface of the electrical component chamber 50. The control panel 51 may substantially shield the front surface of the electrical component chamber 50.

According to an embodiment, the cooktop 20 may include the upper plate 21, a cooktop case 23, and the cooktop burner 22. The cooktop case 23 may be arranged between the oven 30 and the upper plate 21 and may have a hexahedron shape having an open top while defining a predetermined inner space under the upper plate 21.

The upper plate 21 may be installed or provided on or at the open top of the cooktop case 23 to cover an upper portion of the cooktop case 23 and at least one cooktop burner 22 may be provided in the inner space of the cooktop case 23. The upper plate 21 may shield the inner space of the cooktop case 23 provided with the cooktop burner 22 and be provided with a through hole allowing a portion of the cooktop burner 22 to be exposed to the outside above the cooktop case 23.

The cooktop burner 22 may include an induction heating module that applies a current to a magnetic coil to generate an eddy current to heat the container to cook food, or may include a radiant heating module to cook food by radiant heat generated by heating a heating coil. Alternatively, the cooktop burner 22 may include a gas burner that cooks food using a flame generated by burning a gaseous fuel. Alternatively, the cooktop burner 22 may include a hidden radiant burner which heats the upper plate with a ceramic uniform burner, which uses the energy generated by burning the gaseous fuel, specifically, radiant energy generated by the gaseous fuel rather than using direct heat.

In addition, a griddle apparatus or griddle 100 may be provided on or at a side of the cooktop 20. The griddle 100 may include a burner 130 installed or provided under a heating plate 120, which is arranged such that an upper portion thereof is open. The griddle 100 may be provided on or at the upper portion of the cooking appliance and may be used to grill meat and vegetables, for example, using the heating plate 120 heated by the burner 130.

Similar to the cooktop 20, the griddle 100 may be provided on the oven 30 and may be provided as a part of the cooktop 20 or provided as an apparatus separate from the cooktop 20. For example, when the griddle 100 constitutes a portion of the cooktop 20, the griddle 100 may be installed or provided in the inner space of the cooktop case 23, which defines the outer appearance of the cooktop 20.

In this case, the inner space of the cooktop case 23 may be partitioned into first and second, or left and right areas, and the cooktop 20 may be configured such that the griddle 100 is installed or provided in the first partitioned area and the cooktop burner 22 is installed or provided in the second partitioned area. In this case, the upper plate 21 may cover only the upper portion of the second area where the cooktop burner 22 is arranged, and the griddle 100 may be provided on or at a side of the upper plate 21 so as not to be covered by the upper plate 21.

As another example, when the griddle 100 is provided as an apparatus separate from the cooktop 20, the griddle 100 may be arranged outside the cooktop case 23 such that the griddle 100 is positioned on or at a side of the cooktop case 23 rather than being arranged in the inner space of the cooktop case 23. The griddle 100 may be provided on or at a side of the cooktop case 23 so as not to be covered by the upper plate 21 as in the previous example. The griddle 100 arranged in this way may be used to construct one cooking appliance together with the cooktop 20 and may be separated from the cooktop 20 and used as a separate apparatus, if necessary.

Figure 3:
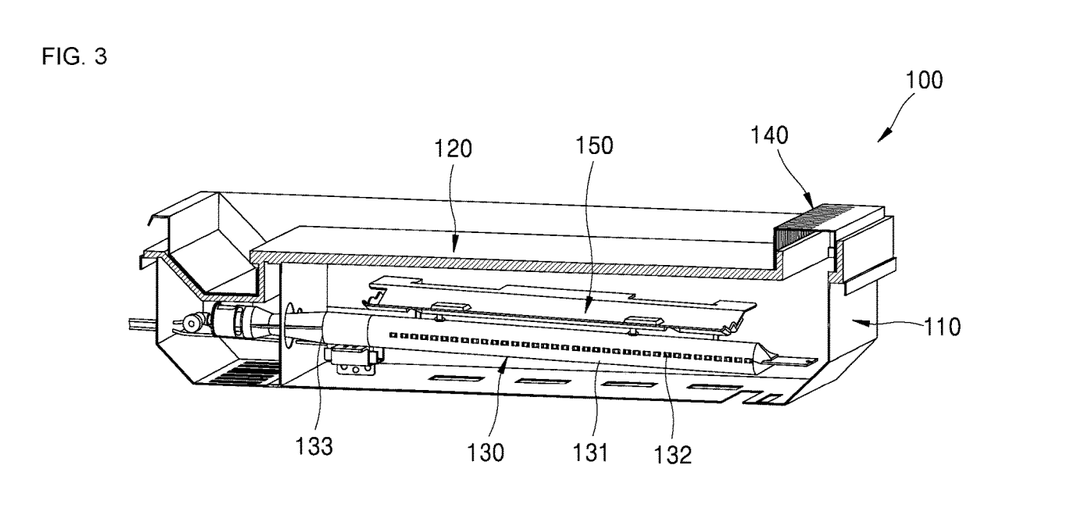
FIG. 3 is a perspective view showing a griddle with a portion of a side surface of the griddle removed according to an embodiment.
Figure 4:
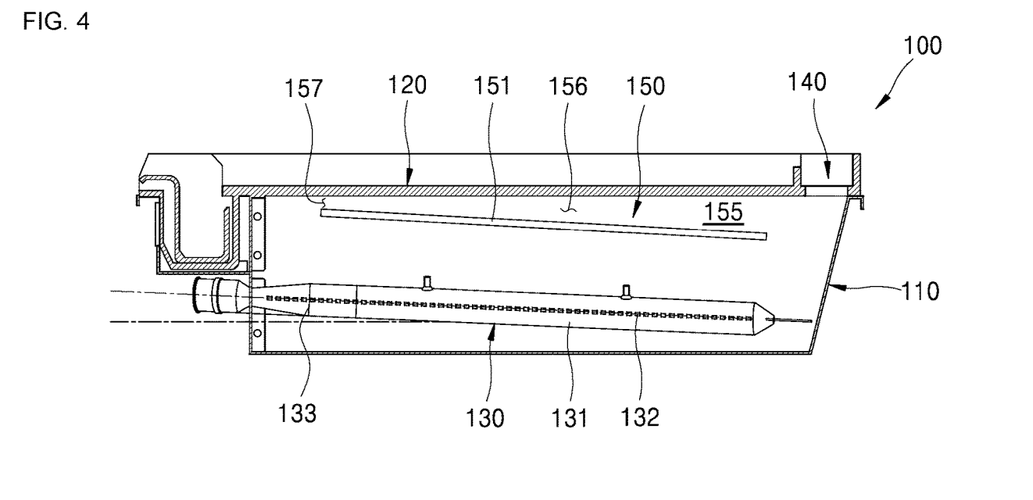
FIG. 4 is a side cross-sectional view schematically showing an internal configuration of the griddle of FIG. 3.

FIG. 3 is a perspective view showing a griddle with a portion of a side surface of the griddle removed according to an embodiment, and FIG. 4 is a side cross-sectional view schematically showing an internal configuration of the griddle of FIG. 3. Referring to FIGS. 2 and 4, the griddle 100 may include a housing 110, a heating plate 120, a burner 130, and an exhaust vent 140.

The housing 110 may form an outer profile of the griddle 100 according to an embodiment. The housing 110 may be formed in the shape of a hexahedron defining a predetermined accommodation space under the heating plate 120 and having an open top.

The heating plate 120 may have a predetermined width and length and have a shape, for example, a rectangular shape, corresponding to the shape of the open top of the housing 110. The heating plate 120 may be seated on the open top of the housing 110 such that one longitudinal side of the heating plate 120 is positioned at a front of the housing 110 and an opposite longitudinal side of the heating plate 120 is positioned at a back of the housing 110. The heating plate 120 may be formed of a metal having high strength and heat transfer performance.

The burner 130 may heat the heating plate 120 and may be installed in the housing 110 under the heating plate 120. The burner 130 may have a length extending in a first or longitudinal direction of the heating plate 120 and may be a gas burner including a burner body 131, a mixing tube 133, and a nozzle.

The burner body 131 may be a straight pipe having a length extending in the first direction of the heating plate 120. As another example, the burner body 131 may be formed in the shape of a "U" pipe by connecting a pair of straight pipes to form the "U" shape. However, the burner body 131 is not limited to one specific shape.

A flow channel, through which a mixed gas may be supplied, may be formed in the burner body 131 to extend in the first direction. A flame hole 132 may be formed in a side portion of the burner body 131 in a penetrating manner.

The flame hole 132 may define a passage through which the gas may be discharged from the burner body 131.

A plurality of flame holes 132 may be arranged in a side portion of the burner body 131 in the first direction of the burner body 131 and spaced apart from each other by a predetermined distance. As a result, a plurality of gas discharge passages may be arranged in the first direction of the burner body 131.

According to this embodiment, the burner body 131 may be supplied with a gas mixed with air, that is, a mixed gas, via the mixing tube 133, which will be described hereinafter. The mixed gas supplied through the flow channel in the burner body 131 may be discharged from the burner body 131 through the flame holes 132 and burned to generate flames on the outside of the burner 130.

The mixing tube 133 may be formed in the shape of a hollow pipe connected to the burner body 131 at a first side thereof. A flow channel in which the gas and air are mixed may be formed in the mixing tube 133. The flow channel formed in the mixing tube 133 may provide a space where gas and air introduced into the mixing tube 133 are mixed with each other while flowing to the burner body 131 through the mixing tube 133.

An air shutter may be provided on or at a second side of the mixing tube 133, opposite the first side, to form a passage through which gas and air may be introduced into the mixing tube 133. The air shutter may have the shape of a hollow tube coupled to the second side of the mixing tube 133 and arranged with a side portion thereof open. External air may be introduced into the mixing tube 133 through the open side portion of the air shutter and an amount of air introduced into the mixing tube 133 may vary depending on a degree of opening of the side portion of the air shutter.

The nozzle may be provided on or at the second side of the mixing tube 133. The nozzle may receive gas through a gas supply pipe and inject the supplied gas into the mixing tube 133. The nozzle may be positioned inside the air shutter, and the gas injected from the nozzle may be introduced into the mixing tube 133 together with air, passing through the inner space of the air shutter.

In the burner 130 having the above configuration, when the gas supplied through the gas supply pipe is injected through the nozzle, the gas injected through the nozzle and the air introduced through the air shutter may be introduced together into the mixing tube 133. The gas and the air introduced into the mixing tube 133 may be mixed while flowing to the burner body 131 through the mixing tube 133. A mixed gas may then be produced. The mixed gas produced in this manner may be supplied into the flow channel in the burner body 131.

The mixed gas supplied into the flow channel in the burner body 131 may be discharged from the burner body 131 through the flame holes 132 and may be burned to generate flames on the outside of the burner 130. Thus, the flames generated by the burner 130 in this manner may generate heat to heat the heating plate 120.

The exhaust vent 140 may form a passage through which exhaust gas produced in the housing 110 by burning in the burner 130 may be discharged from the housing 110, namely from the griddle 100. The exhaust vent 140 may be formed in the shape of a rectangular metal plate elongated in a lateral direction. Exhaust holes in the form of a track-shaped long slot extended in a second direction may be formed in an upper surface of the exhaust vent 140 and arranged in parallel in the second direction.

The exhaust holes may be formed through a piercing process, for example. In this process, a piercing mold may be moved downward from an upper position to cause burs on inner circumferential surfaces of the exhaust holes to face downward, thereby enhancing aesthetic quality of an exterior and preventing sharp burs from being exposed to the outside.

The exhaust vent 140 may be provided on the housing 110 so as to be positioned on a rear portion of the housing 110 adjacent to the opposite longitudinal side of the heating plate 120. The exhaust gas produced in the housing 110 by burning in the burner 130 may be moved to the rear portion of the housing 110 and may be discharged from the griddle 100 through the exhaust vent 140.

The griddle 100 may further include a flow channel guide 150. The flow channel guide 150 may be arranged between the heating plate 120 and the burner 130 to separate the heating plate 120 from the burner 130. The flow channel guide 150 arranged in this way may prevent flames generated in the burner 130 from directly contacting the heating plate 120 and may also cause heat generated by burning in the burner 130 to be indirectly transferred to the heating plate 120. An operation of the flow channel guide 150 will be described hereinafter.

The burner 130 may be arranged such that a first longitudinal side of the burner 130 (hereinafter, referred to as the "front side of the burner 130") adjacent to a first longitudinal side of the heating plate 120 (hereinafter, referred to as the "front side of the heating plate 120") is positioned closer to the heating plate 120 than a second longitudinal side of the burner 130 (hereinafter, referred to as the "rear side of the burner 130") opposite to the first longitudinal side and adjacent to the exhaust vent port 140. Accordingly, the burner 130 may be arranged such that the flame holes 132 positioned on the front side of the burner 130 may be closer to the heating plate 120 than the flame holes 132 positioned on the rear side of the burner 130.

The burner 130 may be inclined such that the front side of the burner 130 is positioned closer to the heating plate 120 than the rear side of the burner 130. That is, the burner 130 may be inclined such that a vertical distance from the burner 130 to the heating plate 120 at the rear side of the burner 130 adjacent to the exhaust vent 140 may be greater than a vertical distance from the burner 130 to the heating plate 120 at the front side of the heating plate 120.

As the burner 130 is arranged in the above-described manner, the front side of the heating plate 120 may be closer to the flames generated in the burner 130 than the rear side of the heating plate 120. Accordingly, when the heating plate 120 is heated, the front side of the heating plate 120 may be more affected by the heat generated by the burner 130 than the rear side of the heating plate 120 is. That is, when burning is performed by the burner 130, the heating plate 120 may be heated in such a manner that the heat generated by the burner 130 is concentrated more on the front side of the heating plate 120 than on the rear side thereof.

Figure 5:
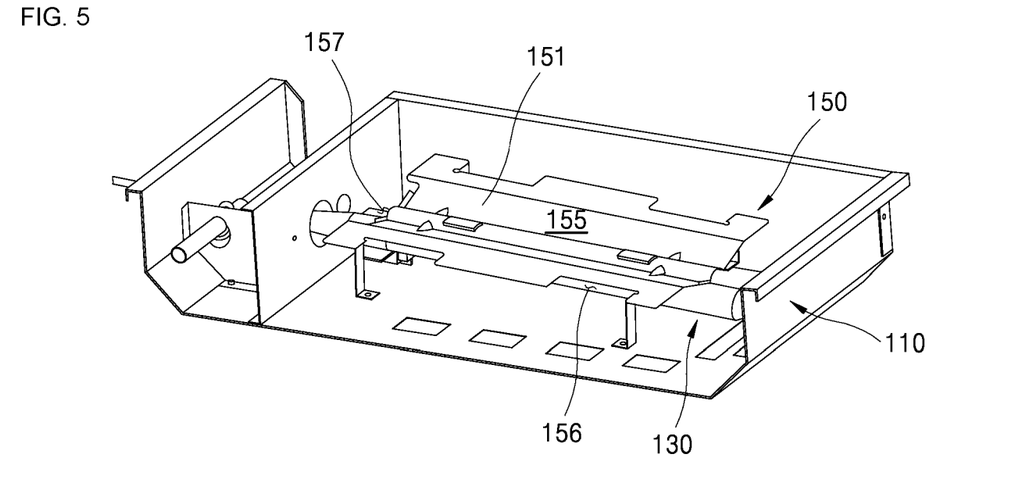
FIG. 5 is a perspective view showing the griddle of FIG. 3 with a heating plate removed.
Figure 6:
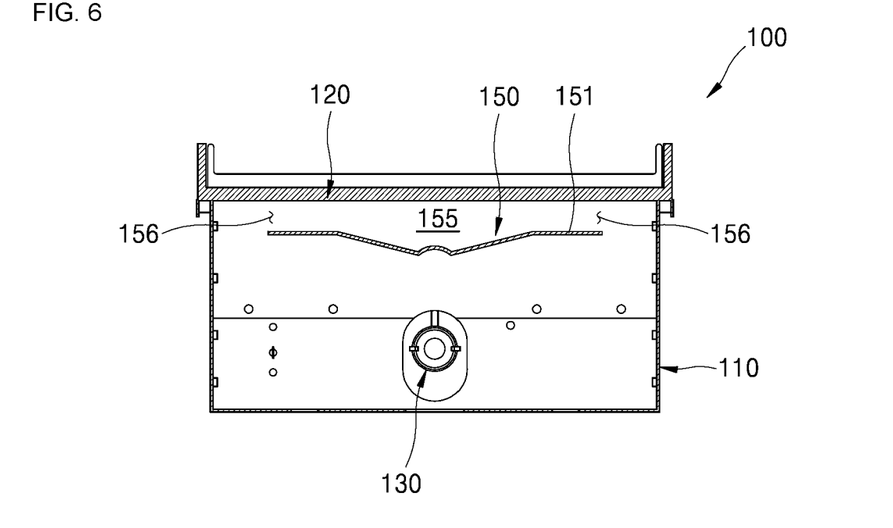
FIG. 6 is a front cross-sectional view schematically showing the internal configuration of the griddle of FIG. 3.

FIG. 5 is a perspective view showing the griddle of FIG. 3 with the heating plate removed, and FIG. 6 is a front cross-sectional view schematically showing the internal configuration of the griddle of FIG. 3. Referring to FIGS. 4 to 6, the flow channel guide 150 may be a metal plate and may be provided under the heating plate 120 so as to be spaced apart from the heating plate 120 by a predetermined distance. A guide flow channel 155 that guides a flow of heated air introduced into an upper portion of the flow channel guide 150 may be formed in the space between the flow channel guide 150 and the heating plate 120 spaced apart from each other as described above.

A side inlet 156 allowing heated air generated by burning in the burner 130 to be introduced into the guide flow channel 155 may be formed on both widthwise sides of the flow channel guide 150 which is arranged as described above. The heated air produced under the flow channel guide 150 by burning in the burner 130 may be introduced into the guide flow channel 155 through the side inlet 156, and the guide flow channel 155 may form a passage through which the heat introduced through the side inlet 156 moves to a widthwise center of the heating plate 120.

A front inlet 157 allowing heated air generated in the burner 130 to be introduced into the guide flow channel may be formed on the first longitudinal side of the flow channel guide 150, that is, on or at a front side of the flow channel guide 150. The heated air produced under the flow channel guide 150 by burning in the burner 130 may be introduced into the guide flow channel 155 through the front inlet 157, and the guide flow channel 155 may form a passage through which the heated air introduced through the front inlet 157 may move to the rear side of the heating plate 120 in the first direction of the heating plate 120.

The flow channel guide 150 may be a flat plate that extends parallel to the heating plate 120 or may include at least one flat surface inclined in the first direction or the second direction with respect to the heating plate 120. The flow channel guide 150 may include at least one flat surface inclined in the first direction or the second direction with respect to the heating plate 120.

The flow channel guide 150 may include a guide surface 151 formed to be inclined. When viewed from the front, the guide surface 151 may be inclined upward from the center of the flow channel guide 150 toward the first and second sides of the flow channel guide 150, for example, in a "V" shape.

When viewed from a side, the guide surface 151 may be inclined upward from the second longitudinal side of the flow channel guide 150 (hereinafter, referred to as the "rear side of the flow channel guide 150") toward the first longitudinal side of the flow channel guide 150 (hereinafter, referred to as the "front side of the flow channel guide 150"). The flow channel guide 150 including the guide surface 151 as described above may be arranged such that the lower surface thereof facing the burner 130 is upwardly inclined toward the first and second sides and front side of the flow channel guide 150.

Figure 7:
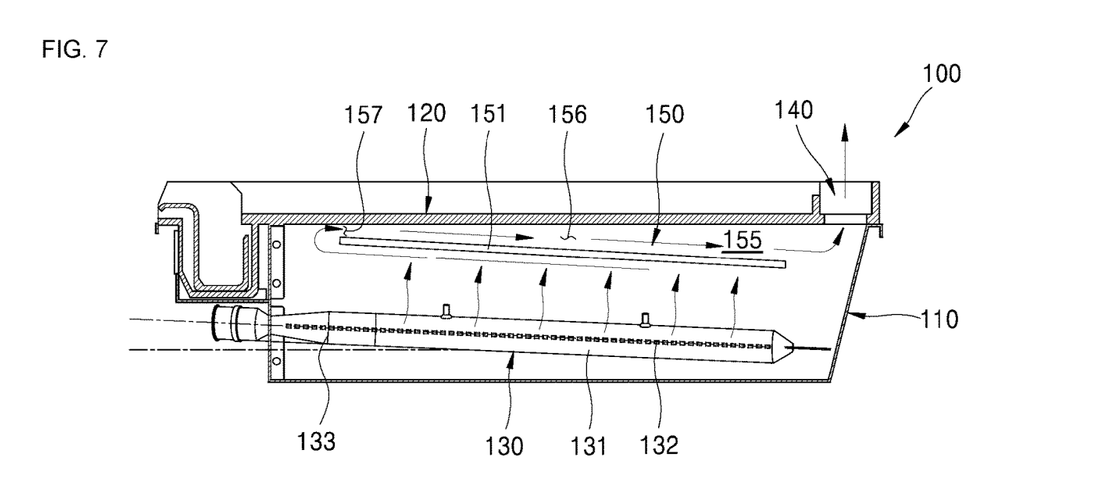
FIG. 7 is a side cross-sectional view illustrating heat flow in the griddle of FIG. 3.
Figure 8:
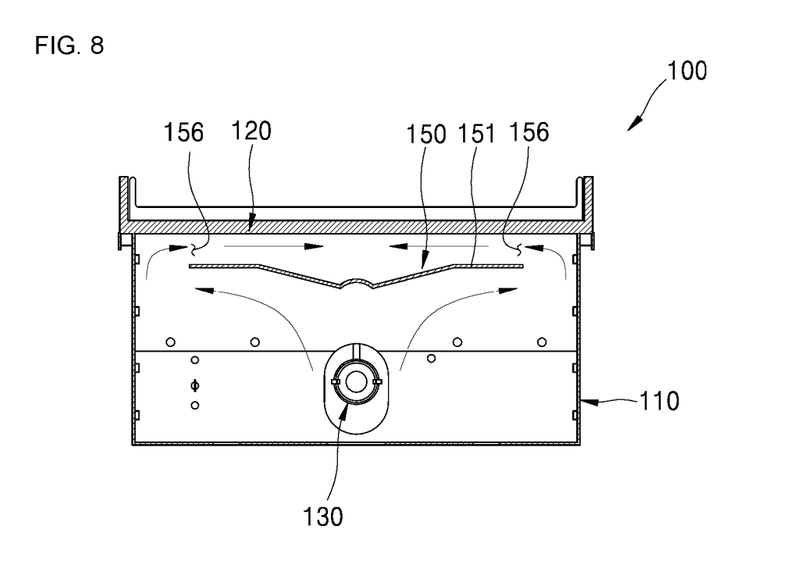
FIG. 8 is a front cross-sectional view illustrating heat flow in the griddle of FIG. 3.

FIG. 7 is a side cross-sectional view illustrating heat flow in the griddle of FIG. 3, and FIG. 8 is a front cross-sectional view illustrating heat flow in the griddle of FIG. 3. Hereinafter, the operation and effect of the griddle 100 according to an embodiment will be described with reference to FIGS. 7 and 8.

When a gas is supplied to the burner 130 and thus is burned by the burner 130, the heating plate 120 may be heated by hot air generated by burning in the burner 130. The exhaust gas produced by burning in the burner 130 may flow toward the exhaust vent 140 arranged at the rear side of the griddle 100 and may be discharged from the griddle 100 through the exhaust vent 140.

Due to movement of the exhaust gas to the rear side of the griddle 100, the hot air transferred through the exhaust gas may be concentrated more toward the rear side of the heating plate 120 than toward the front side of the heating plate 120. Thereby, the entire heating plate 120 may not be uniformly heated and temperatures of the rear side and the front side of the heating plate 120 may differ from each other. In order to address this issue, the burner 130 may be arranged such that the vertical distance between the burner 130 and the heating plate 120 at the rear side of the burner 130 adjacent to the exhaust vent 140 is greater than the vertical distance between the burner and the heating plate 120 at the front side of the burner 130 adjacent to the front side of the heating plate 120.

As the burner 130 is inclined, the front side of the heating plate 120 may be positioned closer to the flames generated by burning in the burner 130 than the rear side of the heating plate 120. Accordingly, when the heating plate 120 is heated, the front side of the heating plate 120 is more affected by the heat generated by the burner 130 than the rear side of the heating plate 120 is.

That is, when burning is performed by the burner 130, the heating plate 120 may be heated in such a manner that the heat generated by the flames is concentrated more at the front side of the heating plate 120 than at the rear side thereof. As a result, a portion of the heating plate 120 subjected to more heat transferred through the exhaust gas may be relatively less heated by the flames, and a portion of the heating plate 120 subjected to less heat transferred through the exhaust gas may be more heated by the flames. Thereby, uniform heating of the entire heating plate 120 may be more effectively performed.

Further, the flow channel guide 150 may be provided between the burner 130 performing burning as described above and the heating plate 120. The flow channel guide 150 may separate the heating plate 120 and the burner 130. The flow channel guide 150 arranged in this way may prevent the flames generated in the burner 130 from directly contacting the heating plate 120 and also may cause the heat generated by burning in the burner 130 to be indirectly transferred to the heating plate 120.

If heating of the heating plate 120 is performed in such a manner that the flames generated in the burner 130 directly contact the heating plate 120, only the portion directly contacting the flames may be intensively heated, and thus, the heating plate 120 may not be uniformly heated. In contrast, the heating plate 120 may be heated in such a manner that the flames generated in the burner 130 do not directly contact the heating plate 120, but the heat generated by the flames may be indirectly transferred to the heating plate 120 through the flow channel guide 150 arranged between the burner 130 and the heating plate 120. Therefore, uniform heating of the entire heating plate 120 may be more effectively performed.

The guide flow channel 155 may be formed between the flow channel guide 150 arranged as described above and the heating plate 120. The exhaust gas and the heated air generated when the burner 130 performs burning may be introduced into the guide flow channel 155, and then flow along the passage formed by the guide flow channel 155.

The exhaust gas and the heated air generated when the burner 130 performs burning may move along the lower surface of the flow channel guide 150 in the first direction and the second direction of the flow channel guide 150, and then may be introduced into the guide flow channel 155 through the side inlets 156 formed at the first and second sides of the flow channel guide 150 and the front inlet 157 formed at the front side of the flow channel guide 150.

Thereby, the exhaust gas and the heated air generated under the flow channel guide 150 may move to the front side of the heating plate 120 along the lower surface of the flow channel guide 150, then flow into the guide flow channel 155 through the front inlet 157, and then flow to the rear side of the guide flow channel 155. The exhaust gas and the heated air may not flow directly to the exhaust vent port 140 but may flow toward the rear side of the heating plate 120 via the front side of the heating plate 120. If the guide surface 151 forming the lower surface of the flow channel guide 150 is inclined toward the front side of the flow channel guide 150, the exhaust gas and the heated air generated under the flow channel guide 150 may be more effectively guided to the front inlet 157 along the lower surface of the flow channel guide 150.

As described above, a concentration of heat transferred through the exhaust gas at the rear side of the heating plate 120 may be alleviated by the flow of the exhaust gas and the heated air, which is formed via the front side of the heating plate 120. Thereby, the difference in temperature between the rear side and the front side of the heating plate 120 heated by the burner 130 may be reduced and the entire heating plate 120 may be uniformly heated.

In addition, in the griddle 100, the exhaust gas and the heated air generated under the flow channel guide 150 may each move to the first and second sides of the heating plate 120 along the lower surface of the flow channel guide 150, then flow into the guide flow channel 155 through the side inlets 156 and flow toward the center of the guide flow channel 155. That is, flow of the exhaust gas and the heated air may be formed in such a manner that the exhaust gas and the heated air are distributed in the second direction of the heating plate 120 rather than being concentrating at the center of the heating plate 120.

If the guide surface 151 forming the lower surface of the flow channel guide 150 is inclined toward the first and second sides of the flow channel guide 150, the exhaust gas and the heated air generated under the flow channel guide 150 may be more effectively guided to the side inlets 156 along the lower surface of the flow channel guide 150. As the flow of the exhaust gas and the heated air is formed via the first and second sides of the heating plate 120, concentration of heat transferred through the exhaust gas at one portion may be alleviated. Thereby, the difference in temperature between the center portion and the side portions of the heating plate 120 heated by the burner 130 may be reduced and the entire heating plate 120 may be uniformly heated.

According to the griddle 100 configured as described above and the cooking apparatus having the same, flames generated by burning in the burner 130 and the heat transferred through the exhaust gas may be uniformly transferred to the entire heating plate 120 such that the entire heating plate 120 may be uniformly heated. Thereby, temperature uniformity over the heating plate 120 may be enhanced and thus cooking may be performed more effectively.

A griddle according to embodiments disclosed herein may include a housing having an accommodation space formed therein and an open top, a heating plate having a predetermined width and length and seated on the top of the housing such that a first longitudinal side thereof is positioned at a front of the housing and a second longitudinal side opposite the first longitudinal side is positioned at a rear of the housing, a burner having a length extending in a first direction of the heating plate and installed or provided inside the housing and arranged under the heating plate, and an exhaust vent port forming a passage to discharge exhaust gas generated in the housing. The exhaust vent port may be arranged at a rear of the housing adjacent to the second longitudinal side of the heating plate. The burner may be arranged such that a first end of the burner adjacent to the first longitudinal side of the heating plate is positioned closer to the heating plate than a second end of the burner opposite the first end and adjacent to the exhaust vent port.

The burner may be inclined such that the first end of the burner adjacent to the first longitudinal side of the heating plate is positioned closer to the heating plate than the second end of the burner adjacent to the exhaust vent port. The burner may be arranged such that a vertical distance to the heating plate decreases from the second end of the burner adjacent to the exhaust vent port to the first end of the burner adjacent to the first longitudinal side of the heating plate.

The burner may include a plurality of flame holes through which flames may be exposed to heat the heating plate, the flame holes being arranged in a first direction of the burner. The burner may be arranged such that a flame hole positioned at the first end of the burner adjacent to the first longitudinal side of the heating plate is closer to the heating plate than a flame hole positioned at the second end of the burner. The griddle may further include a flow channel guide arranged between the heating plate and the burner to separate the heating plate from the burner.

The flow channel guide may be arranged under the heating plate so as to be spaced apart from the heating plate by a predetermined distance. A guide flow channel that guides a flow of heated air introduced into an upper portion of the flow channel guide may be formed in a space between the heating plate and the flow channel guide. A side inlet through which heat generated by the burner may be introduced into the guide flow channel may be formed on first and second sides of the flow channel guide, wherein the guide flow channel forms a passage through which heated air introduced into the side inlet to a center of the heating plate in a second direction of the heating plate may have.

The flow channel guide may include a guide surface inclined from a center of the flow channel guide toward the first and second sides of the flow channel guide. A first longitudinal side of the flow channel guide may include a front inlet through which the heated air generated by the burner may be introduced into the guide flow channel. The guide flow channel may form a passage for moving the heated air introduced into the front inlet to the second longitudinal side of the heating plate in the first direction of the heating plate. The flow channel guide may include a guide surface inclined upward from a first end of the flow channel guide toward a second end of the flow channel guide.

A cooking appliance according to embodiments disclosed herein may include a cooktop case, and a griddle installed or provided inside or outside the cooktop case. The griddle may include a housing having an accommodation space formed therein and an open top, a heating plate having a predetermined width and length and seated on the top of the housing such that a first longitudinal side thereof is positioned at a front of the housing and a second longitudinal side thereof is positioned at a rear of the housing, a burner having a length extending in a first direction of the heating plate and installed inside the housing and arranged under the heating plate, and an exhaust vent port forming a passage to discharge exhaust gas generated in the housing. The exhaust vent port may be arranged at the rear of the housing adjacent to the second longitudinal side of the heating plate. The burner may be arranged such that a first end of the burner adjacent to the first longitudinal side of the heating plate is positioned closer to the heating plate than a second end of the burner adjacent to the exhaust vent port.

The cooking appliance may further include a cooktop heater installed in the cooktop case. The griddle may be provided adjacent to the cooktop burner. An upper plate may be installed or provided on the cooktop case, and the griddle may be arranged adjacent to a side of the upper plate.

A cooking appliance according to embodiments disclosed herein may include a body, and a griddle installed or provided on the body. The griddle may include a housing having an accommodation space formed therein and an open top, a heating plate having a predetermined width and length and seated on the top of the housing such that a first longitudinal side thereof is positioned toward a front of the housing and a second longitudinal side thereof is positioned toward a rear of the housing, a burner having a length extending in a first direction of the heating plate and installed or provided inside the housing and arranged under the heating plate, and an exhaust vent port forming a passage to discharge exhaust gas generated in the housing. The exhaust vent port may be arranged toward a rear of the housing adjacent to the second longitudinal side of the heating plate. The burner may be arranged such that a first end of the burner adjacent to the first longitudinal side of the heating plate is positioned closer to the heating plate than a second end of the burner adjacent to the exhaust vent port.

According to a griddle and a cooking appliance having a griddle according to embodiments disclosed herein, flames generated by the burner and the heat transferred through the exhaust gas may be uniformly transferred to the entire heating plate such that the entire heating plate may be uniformly heated. Thereby, temperature uniformity over the heating plate may be enhanced, and thus, cooking may be performed more effectively.

An embodiment of a griddle and a cooking appliance having a griddle according to embodiments are described with reference to the drawings. It will be appreciated that for simplicity and clarity of illustration, thicknesses of lines and dimensions of elements shown in the drawings may be exaggerated. In addition, terms used herein are defined in consideration of functions, and may be replaced by other terms based on intensions of a user or operator, or customs, for example. Therefore, the terms used herein should be construed based on the whole content of this specification.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A griddle, comprising:
   a housing forming an accommodation space having an open top;
   a heating plate having a predetermined width and length and seated on the top of the housing such that a first end of the heating plate is positioned at a front of the housing and a second end of the heating plate is positioned at a rear of the housing;
   a burner having a length extending in a first direction of the heating plate and provided inside the housing under the heating plate;
   an exhaust vent forming a passage to discharge to an outside of the housing exhaust gas generated by the burner in the housing, wherein the exhaust vent is provided at the rear of the housing adjacent to the second end of the heating plate, and wherein the burner is arranged such that a first end of the burner adjacent to the first end of the heating plate is positioned closer to the heating plate than a second end of the burner adjacent to the exhaust vent, and
   a flow channel guide arranged between the heating plate and the burner to separate the heating plate from the burner.

2. The griddle according to claim 1, wherein the burner is inclined such that the first end of the burner is positioned closer to the heating plate than the second end of the burner.

3. The griddle according to claim 1, wherein the burner is arranged such that a distance between the burner and the heating plate decreases from the second end of the burner toward the first end of the burner.

4. The griddle according to claim 1, wherein the burner includes a plurality of flame holes through which flames are exposed in order to heat the heating plate, the plurality of flame holes being sequentially arranged in the first direction, and wherein the burner is arranged such that a flame hole positioned at the first end of the burner is closer to the heating plate than a flame hole positioned at the second end of the burner.

5. The griddle according to claim 1, wherein the flow channel guide is provided under the heating plate so as to be spaced apart from the heating plate by a predetermined distance, and wherein a guide flow channel that guides a flow of heated air introduced into an upper portion of the flow channel guide is formed between the heating plate and the flow channel guide.

6. The griddle according to claim 5, wherein at least one side inlet through which heated air generated by the burner flows into the guide flow channel is formed on each of a first and second side of the flow channel guide, and wherein the guide flow channel forms a passage through which the heated air introduced into the at least one side inlet flows toward a center of the heating plate in a second direction.

7. The griddle according to claim 6, wherein the flow channel guide includes a guide surface inclined upward from a center of the flow channel guide toward both the first and second sides of the flow channel guide.

8. The griddle according to claim 5, wherein a first end of the flow channel guide includes a front inlet through which the heated air generated by the burner flows into the guide flow channel, and wherein the guide flow channel forms a passage through which the heated air introduced into the front inlet flows toward the second end of the heating plate in the first direction of the heating plate.

9. The griddle according to claim 8, wherein the flow channel guide includes:
   a guide surface inclined upward from a second end of the flow channel guide toward the first end of the flow channel guide.

10. A cooking appliance, comprising:
a cooktop case; and
a griddle provided inside or outside the cooktop case, wherein the griddle includes:
- a housing forming an accommodation space having an open top;
- a heating plate having a predetermined width and length and seated on the top of the housing such that a first end of the heating plate is positioned at a front of the housing and a second end of the heating plate is positioned at a rear of the housing;
- a burner having a length extending in a first direction of the heating plate and provided inside the housing under the heating plate;
- an exhaust vent forming a passage to discharge exhaust gas generated by the burner in the housing, wherein the exhaust vent is provided at the rear of the housing adjacent to the second end of the heating plate; and
- a flow channel guide arranged between the heating plate and the burner; wherein air heated by the burner under the flow channel guide is introduced into a space between the heating plate and the flow channel guide to heat the heating plate.

11. The cooking appliance according to claim 10, further including:
a cooktop burner provided in the cooktop case, wherein the griddle is provided adjacent to the cooktop burner.

12. The cooking appliance according to claim 10 wherein the flow channel guide is arranged under the heating plate so as to be spaced apart from the heating plate by a predetermined distance, and wherein a guide flow channel that guides a flow of heated air introduced into an upper portion of the flow channel guide is formed in the space between the heating plate and the flow channel guide.

13. The cooking appliance according to claim 12, wherein at least one side inlet through which heated air generated by the burner flows into the guide flow channel is formed at each of a first and second side of the flow channel guide, and wherein the guide flow channel forms a passage through which the heated air introduced into the at least one side inlet flows toward a center of the heating plate in a second direction.

14. The cooking appliance according to claim 13, wherein the flow channel guide includes a guide surface inclined from a center of the flow channel guide toward each of the first and second sides of the flow channel guide.

15. A cooking appliance, comprising:
a body; and
a griddle provided on the body, wherein the griddle includes:
- a housing that forms an accommodation space having an open top;
- a heating plate including a first end and a second end and provided to cover the open top of the accommodation space;
- a burner including a first end and a second end and provided in the accommodation space arranged in a first direction;
- a flow channel guide provided between the burner and the heating plate and arranged parallel to the burner; and
- an exhaust vent provided at the second end of the heating plate to allow exhaust gas generated by the burner to be exhausted to an outside, wherein the burner is arranged such that the first end is positioned closer to the heating plate than the second end.

16. The cooking appliance according to claim 15, wherein the flow channel guide includes a first guide surface inclined from a center of the flow channel guide toward a first side of the housing and a second guide surface inclined from the center of the flow channel guide toward a second side of the housing opposite the first side.

17. The cooking appliance according to claim 16, wherein a guide flow channel is formed between the flow channel guide and the heating plate such that air heated by the burner flows through the guide flow channel through a front inlet arranged at a first end of the flow channel guide toward the exhaust vent.

18. The cooking appliance according to claim 16, wherein a guide flow channel is formed between the flow channel guide and the heating plate such that air heated by the burner flows into at least one side inlet of the guide flow channel arranged at a first and second side of the flow channel guide.

19. The griddle according to claim 15, wherein the burner is arranged such that a distance between the burner and the heating plate increases from the first end of the burner toward the second end of the burner.

* * * * *